(12) United States Patent
Sachdev

(10) Patent No.: US 10,037,148 B2
(45) Date of Patent: Jul. 31, 2018

(54) FACILITATING REVERSE READING OF SEQUENTIALLY STORED, VARIABLE-LENGTH DATA

(71) Applicant: LinkedIn Corporation, Mountain View, CA (US)

(72) Inventor: Sanjay Sachdev, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 14/988,444

(22) Filed: Jan. 5, 2016

(65) Prior Publication Data

US 2017/0192674 A1 Jul. 6, 2017

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ........ G06F 3/065; G06F 3/0619; G06F 3/064; G06F 3/0659; G06F 3/0673; G06F 3/061; G06F 17/30336
USPC ......................................................... 711/154
See application file for complete search history.

(56) References Cited

U.S. PATENT DOCUMENTS

| | | | | |
|---|---|---|---|---|
| 5,200,864 A | * | 4/1993 | Dunn | .................... G06F 3/0601 360/20 |
| 5,335,328 A | * | 8/1994 | Dunn | .................... G06F 3/0607 360/48 |
| 6,487,633 B1 | * | 11/2002 | Horst | ...................... G06F 3/061 711/112 |
| 2003/0070056 A1 | * | 4/2003 | Greco | ..................... G06F 3/061 711/202 |
| 2003/0135495 A1 | | 7/2003 | Vagnozzi | |
| 2004/0057545 A1 | * | 3/2004 | Hayashi | ............. G11B 20/1403 375/368 |
| 2012/0197900 A1 | | 8/2012 | Mandre | |

(Continued)

FOREIGN PATENT DOCUMENTS

| | | | | |
|---|---|---|---|---|
| EP | 1427213 A1 | * | 6/2004 | ........... H04N 21/235 |
| WO | WO-0184298 A1 | * | 11/2001 | ....... G06F 17/30607 |

OTHER PUBLICATIONS

Wikipedia: "Variable-length quantity" https://en.wikipedia.org/wiki/Variable-length_quantity, downloaded from Wikipedia Dec. 27, 2016.

*Primary Examiner* — Reginald G Bragdon
*Assistant Examiner* — Aaron D Ho
(74) *Attorney, Agent, or Firm* — Park, Vaughan, Fleming & Dowler LLP

(57) ABSTRACT

A system, method, and apparatus are provided for facilitating reverse reading of sequentially stored variable-length data records. Each record is stored with accompanying size metadata that identifies the size or length of the record. Further, if the length of a given record is greater than a threshold (e.g., 127 bytes when the length is stored with variable-length quantity encoding), such that more than one byte (or other storage unit) is needed to store the record length, an additional byte (or other unit) is configured to store the size/length of the record length (e.g., the number of bytes required to store the record length). The most significant bit of the additional byte is set to 1, so that during reverse reading, the location and size of the record length value can be quickly determined.

20 Claims, 5 Drawing Sheets

(56) References Cited

U.S. PATENT DOCUMENTS

2015/0331619 A1   11/2015  Zheng
2017/0082446 A1   3/2017   Long

* cited by examiner

FACILITATING REVERSE READING OF SEQUENTIALLY STORED, VARIABLE-LENGTH DATA

BACKGROUND

This disclosure relates to the field of computer systems and data storage. More particularly, a system, method, and apparatus are provided for formatting sequentially stored variable-length data in a manner that facilitates reverse reading of the data.

Variable-length data are stored in many types of applications and computing environments. For example, events that occur on a computer system, perhaps during execution of a particular application, are often logged and stored sequentially (e.g., according to timestamps indicating when they occurred) in log files, log-structured databases, or other repositories. Because different information is typically recorded for different events (e.g., different system metrics or application metrics), the records often have varying lengths.

When reading the recorded data in the same order it was written, it is relatively easy to quickly navigate the data and proceed from one record to the next, to find a requested record or for some other purpose. However, when attempting to scan the data in reverse order (e.g., to find the most recent record of a particular type or containing particular information), the task is more difficult because the storage schemes typically are not designed to enhance reverse navigation or scanning.

DETAILED DESCRIPTION

Figure 1:
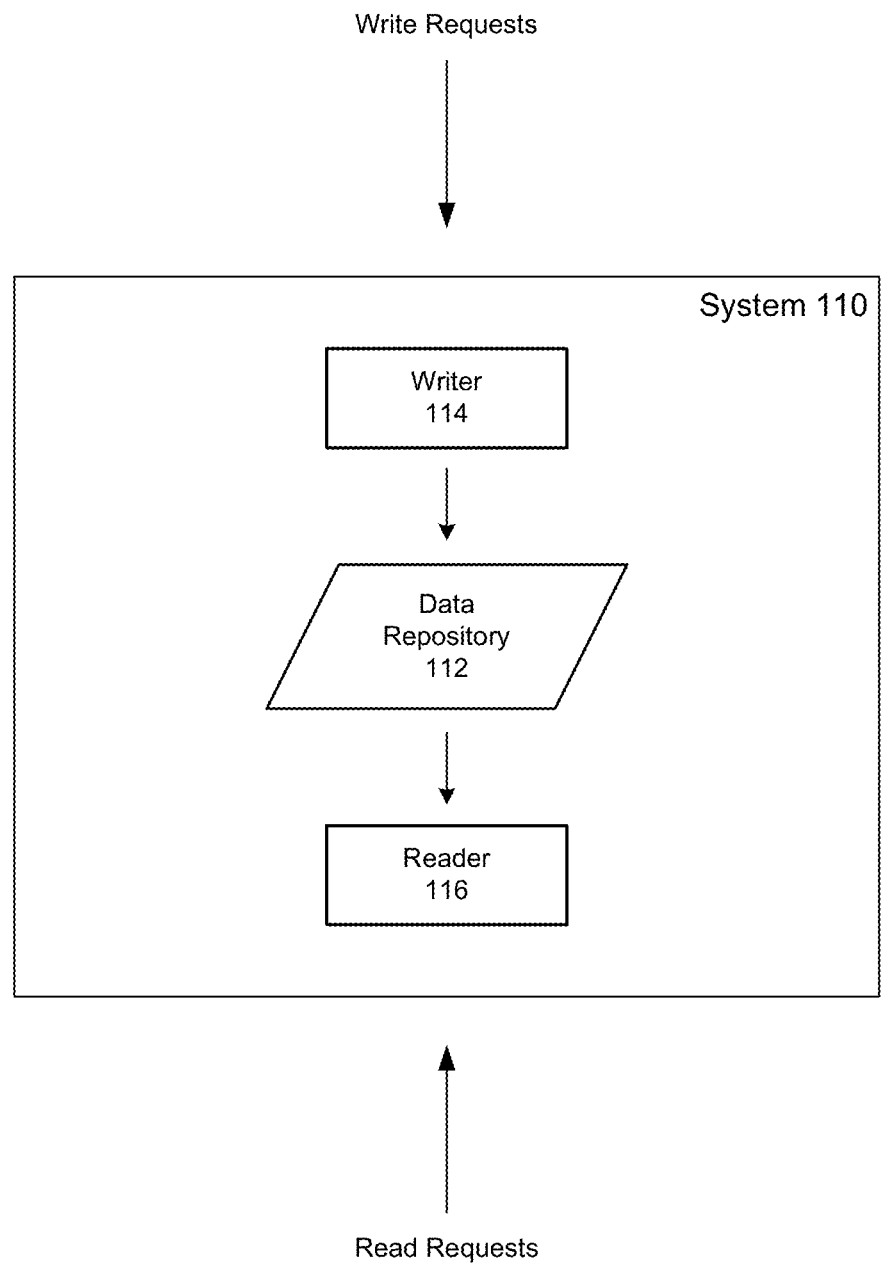
FIG. 1 is a block diagram depicting a system in which variable-length data is sequentially stored in a manner that facilitates reverse reading, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for facilitating reverse reading of sequentially stored variable-length data records. Reading the data in reverse means reading, scanning, or other navigating through the records in the reverse order from the order in which they were stored. Because the records are of variable lengths, there may be wide variation in the sizes of the records.

In these embodiments, an efficient scheme is implemented to make it easier and faster to determine the size of a record, thereby allowing a reverse reader to quickly move to the beginning of the record in order to read the record and/or to continue the reverse reading process at the next record in reverse order.

In particular, after the record is stored in sequential order, the length of the record is stored with variable-length quantity (VLQ) encoding. With VLQ encoding, a binary representation of the record length (in bytes) is divided into 7-bit partitions. Each partition is stored in an 8-bit octet in which the most significant (or highest-order) bit indicates whether another octet follows the current one.

Specifically, if the record length requires more than one octet (i.e., at least 128 (or $2^7$) bytes were needed to store the record), every octet except the last octet, which stores the least significant bits of the record length, will have a first value (e.g., 1) as the most significant bit (MSB), while the last octet has a second value (e.g., 0) as the most significant bit. If the record length requires only one octet to store (i.e., the record is less than 128 bytes long), that length is stored with the second value (e.g., 0) as the most significant bit.

However, records that are 128 bytes long, or longer, will still be of varying lengths, and current computing systems will require up to a total of ten octets (or bytes) to store a value representing the length (or size) of a given data record. In particular, a computer or other device that features a 64-bit processor will require up to ten octets to store a 64-bit value (with each octet containing up to 7 of the 64 bits).

This scheme works fine when reading or scanning sequentially stored variable-length data records in the order in which they were stored, because each octet storing a portion of the record's length can be consumed in order and the most significant bits will indicate when the record length value is complete. However, when reading the data in reverse order, the most significant bit of the final octet in the record length (i.e., the first octet that would be encountered when reading in reverse order) will always be 0 and the reader cannot immediately determine how many octets were used to store the record length.

Therefore, in some embodiments, when a variable-length record is stored, the record's length is stored afterward with VLQ encoding, and one additional byte is conditionally formatted and stored after the record length. Specifically, if the record length was stored in one octet/byte (i.e., the record is less than 128 bytes long), which has 0 as the most significant bit, nothing further is done. However, if more than one octet/byte was required to store the record length, then one additional byte is configured and stored after the record length. This additional byte stores the size (in bytes) of the record length, and the value 1 in its most significant bit. This additional byte may be said to store a "size of the size" value, because it stores the size (or length) of the value that identifies the size (or length) of the corresponding record. The "size of the size" byte and the VLQ-encoded record length may be collectively termed 'size metadata' for the accompanying record (i.e., the record that precedes the metadata).

When reverse-reading the sequentially stored variable-length data, from the end of the collection of records (e.g., at the end-of-file marker) or at the starting location of the most recently read record, the next byte in reverse order from the current offset is read. If its most significant bit is 0, the byte stores the size of the preceding record (the next record in reverse order) and the reader can identify the beginning of the record by subtracting that size (in bytes) from its current offset. If the most significant bit is 1, the lower seven bits identify the size of the record length value (in bytes). By subtracting that size from the current offset, the reader can identify the start of the VLQ-encoded record length. The record length can then be read to identify the length of the record (in bytes), which can be subtracted from the offset of the start of the VLQ-encoded record length to find the start of the record.

FIG. 1 is a block diagram depicting a system in which variable-length data is sequentially stored in a manner that facilitates reverse reading, in accordance with some embodiments.

System 110 of FIG. 1 includes data repository 112, which may be a log-structured database, a sequential log file, or some other entity. Of note, the repository specifically stores variable-length records in sequential manner (e.g., based on timestamps and/or other indicia). The records may contain different types of data in different implementations, without exceeding the scope of embodiments described herein.

System 110 also includes writer 114 and reader 116. Writer 114 writes new records to data repository 112 in response to write requests, with each new record being stored (immediately) after the previously stored record. Reader 116 traverses (e.g., and reads) records in reverse order from the data repository in response to read requests. Reader 116 may also traverse, navigate, and/or read records in the order in which they are stored, but in current embodiments the reader frequently or regularly is tasked to reverse-navigate the stored data. The reader may navigate the stored data (in either direction) not only to search for one or more desired records, but also to construct (or help construct) an index, linked list, or other structure, or for some other purpose (e.g., to purge stale data, to compress the stored data). Writer 114 and reader 116 may be separate code blocks, computer processes, or other logic entities, or may be separate portions of a single entity.

Write requests and read requests may be received from various entities, including computing devices co-located with and/or separate from system 110, other processes (e.g., applications, services) executing on the same computer system(s) that include system 110, and/or other entities.

For example, system 110 of FIG. 1 may be part of a data center or other cooperative collection of computing resources, and include additional or different components in different embodiments. Thus, the system may include storage components other than data repository 112, and may include processing components, communication resources, and so on. Although only a single instance of a particular component of system 110 may be illustrated in FIG. 1, it should be understood that multiple instances of some or all components may be employed. In particular, system 110 may be replicated within a given computing environment, and/or multiple instances of a component of the system may be employed.

Figure 2A:
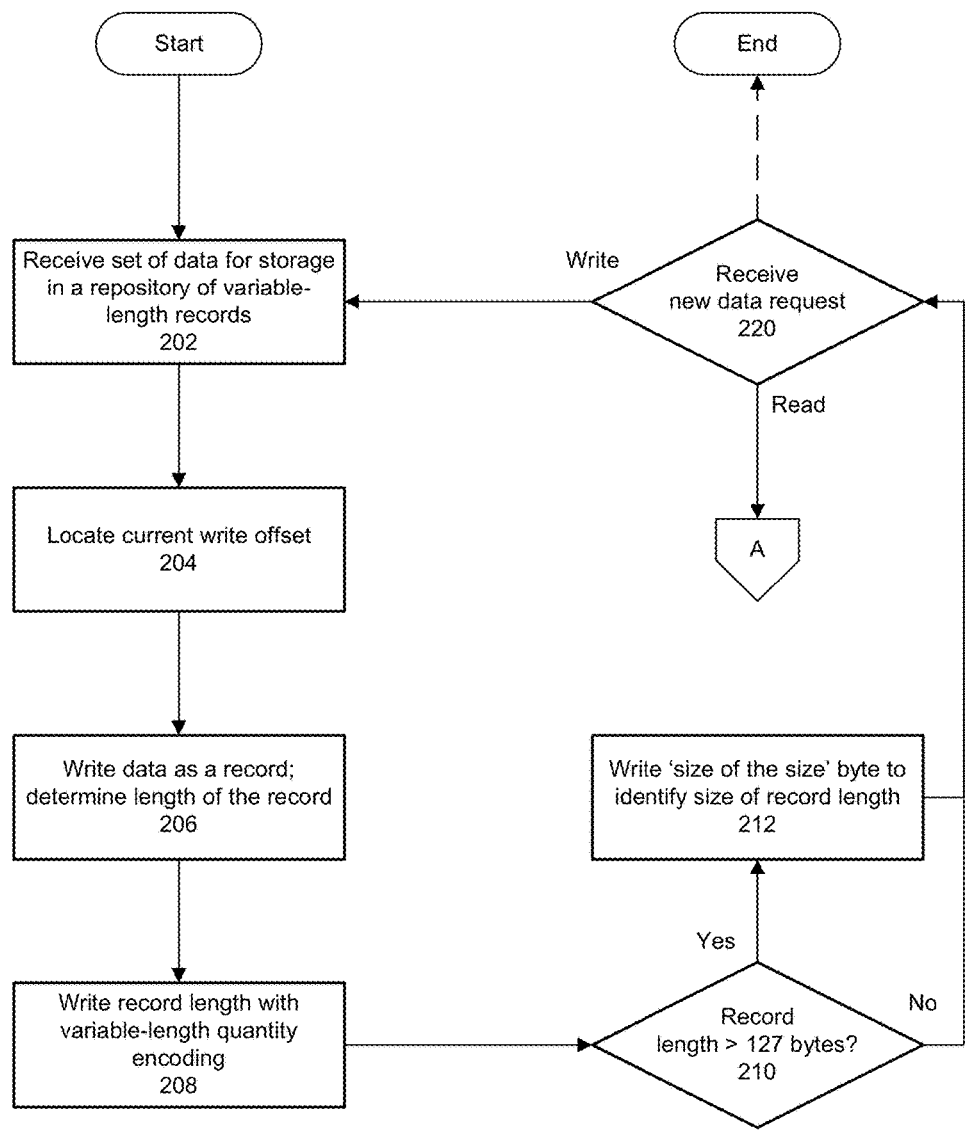
FIGS. 2A-B comprise a flow chart illustrating a method of facilitating reverse reading of sequentially stored variable-length data, in accordance with some embodiments.
Figure 2B:
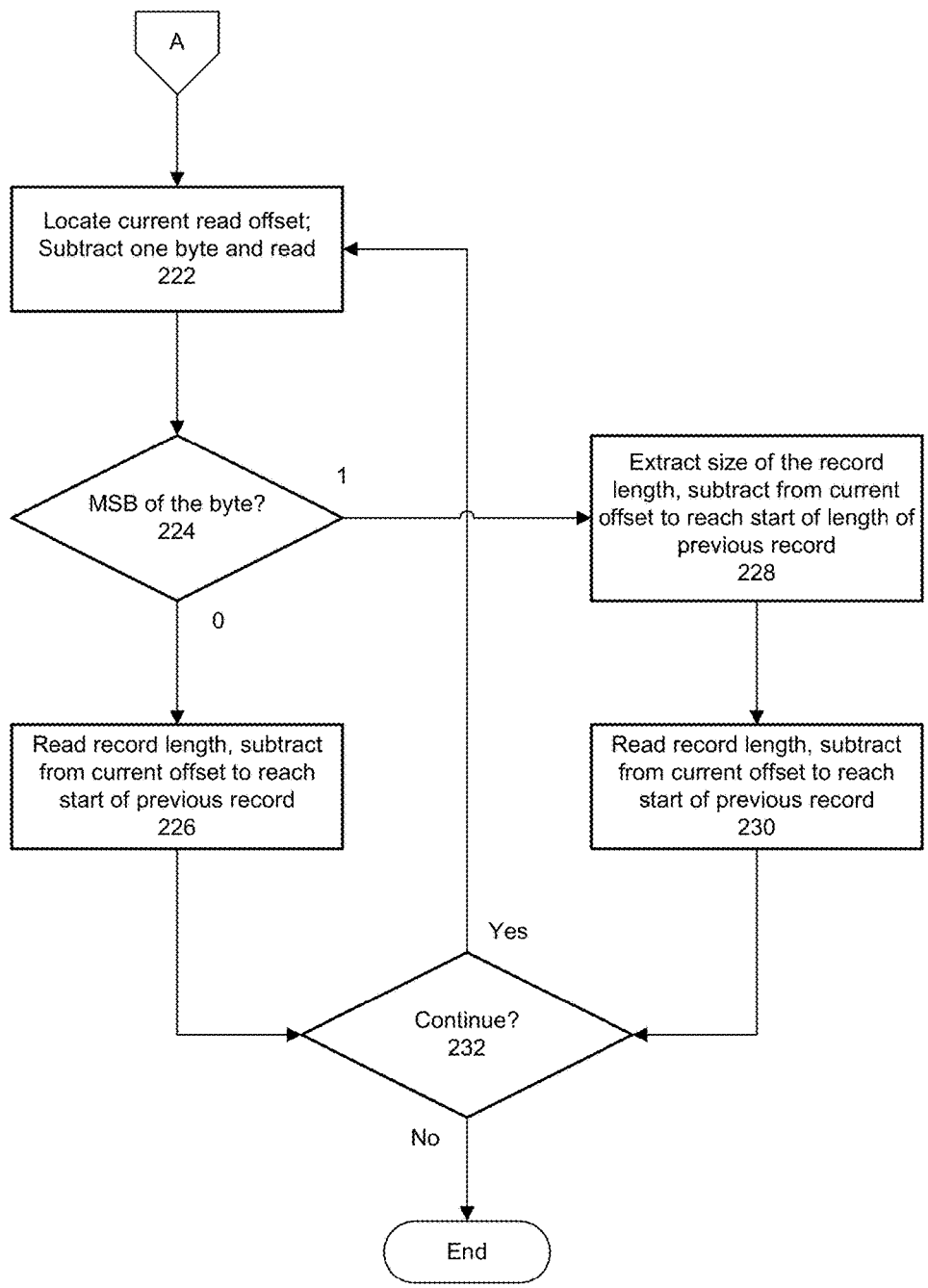

FIGS. 2A-B comprise a flow chart illustrating a method of facilitating reverse reading of sequentially stored variable-length data, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In these embodiments, one or more data repositories (e.g., databases, files or file systems) sequentially store the variable-length data as individual records, each of which has a corresponding length (or size) that can be measured in terms of bytes (or other units). The manner in which the records are stored facilitates their reading in reverse order, and the manner in which they are reverse-read depends on how they are stored.

In operation 202 of the illustrated method, a new set of data is received for storage. If not already in a form to be stored, it may be assembled into a record, which may involve compressing the data, encoding or decoding it, encrypting or decrypting it, and/or some other pre-processing. In some implementations, no pre-processing is required because the data can be stored in the same form in which it is received.

In operation 204, the end of the previously stored record (including associated size metadata) is identified, which may be readily available in the form of a pointer or other reference that identifies a current write offset within the data repository. If the data are to be stored in a new data repository that contains no other records, this current write offset may be the first storage location of the repository.

In operation 206, the data are written with suitable encoding, which may vary from one implementation to another. Before, after, or as the data are written, the length of the written data record is determined (e.g., as a number of bytes occupied by the record).

In operation 208, the record length is written with variable-length quantity (VLQ) encoding, which is described above. Specifically, the binary representation of the record length is divided into 7-bit groups, starting from the least significant bit, so that if the length is 128 bytes or greater (i.e., length$\geq 2^7$) only the group containing the most significant bits may contain less than 7 bits, which is padded with zeros to form a 7-bit group.

Each 7-bit group is stored after the data record in a separate octet (or byte), in order, from the most significant to least significant. The most significant bits (or sign bits) of all but the last (least significant) octet are set to 1 to indicate, when the record length is read in the same order in which it was written, that there is at least one more octet to be read in order to assemble the record length. The most significant bit of the last octet is set to 0 to indicate that it is the final portion of the record length. Similarly, if the record length is less than 128 bytes, and can be stored in a single octet, the most significant bit of that octet is set to 0.

In operation 210, the data writer (e.g., writer 112 of system 110 of FIG. 1) or a process/entity that controls the writer determines whether the record length was 128 bytes or more or, in other words, whether more than one octet or byte was used to store the record length. If so, the method continues at operation 212; otherwise, the method advances to operation 220.

In operation 212, the 'size of the size', or the number of bytes needed to store the record length, is stored in the least significant bits of the additional octet/byte, and the value 1 is stored in the most significant bit. Because this 'size of the size' byte can store a value of up to 127 (in base-10), it can report a record length of up to 127 bytes, which corresponds to a record that is far larger than existing computer architectures can (or need to) accommodate (i.e., $2^{(127 \times 7)}-1$).

In operation 220, a new data request is received—either a request to store a new set of data or a request to retrieve a previously stored set of data. If the request is a write request, the method returns to operation 202; if the request is a read request, the method advances to operation 222 (FIG. 2B). In some embodiments, such as when separate processes handle the different types of data requests, some operations may be handled in parallel.

In operation 222, the current read offset is identified or located (e.g., with a read pointer), which may be the end of the size metadata of the final record that was stored in the repository, or the end of some other set of size metadata. The value of one byte is subtracted from the current offset and that byte (which is the final byte of the size metadata of the previous or preceding record in the repository) is read.

In operation 224, the most significant bit of the current byte is identified. If the MSB has the value 0, the method continues at operation 226; otherwise, the method advances to operation 228.

In operation 226, the current byte stores the length (or size) of the preceding record (the 'next' record in reverse order), in bytes, and that value (up to 127 in decimal notation) is subtracted from the current offset in order to reach the start of the preceding record. The method then advances to operation 232.

In operation 228, the lower 7 bits of the current byte are extracted, which store the size of the length of the preceding record, in bytes. That value (up to 127 in decimal notation) is subtracted from the current read offset to identify the offset of the VLQ-encoded record length.

In operation 230, the record length is read and subtracted from the current offset to reach the start of the preceding record (which makes it the 'current' record).

In operation 232, if the reverse navigation/traversal of the data records is finished (e.g., the current record is the last/only record sought in the read request), the method ends or returns to a previous operation (e.g., operation 220 to receive a new data request). Otherwise, the method returns to operation 222 to locate the start of the previous record.

Figure 3:
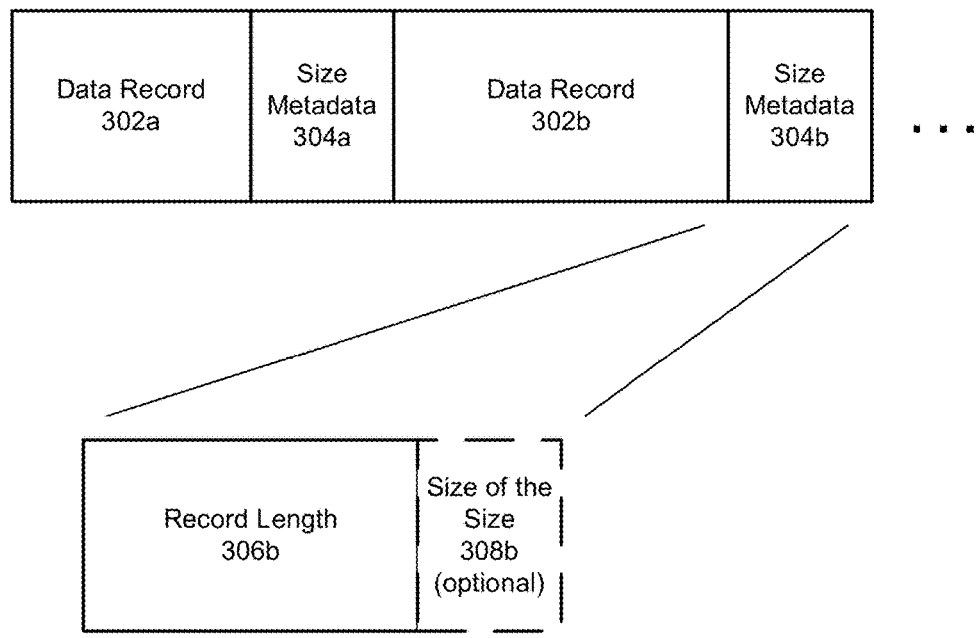
FIG. 3 is a block diagram depicting sequential storing of variable-length data to facilitate reverse reading, according to some embodiments.

FIG. 3 is a block diagram depicting sequential storing of variable-length data to facilitate reverse reading, according to some embodiments.

In these embodiments, data records 302 (e.g., records 302a, 302b) have varying lengths (or sizes), and are stored sequentially with accompanying size metadata 304 (e.g., metadata 304a, 304b). Any number of records (and corresponding size metadata) may be stored, and the repository of the data may be a text file, a log-structured database, or have some other form, and may reside on a magnetic or optical disk, a flash drive, a solid state drive, or some other hardware.

Illustrative size metadata 304b includes record length 306b, which identifies the length (e.g., in bytes) of corresponding data record 302b, and optional size of the size 308b, which, if present, identifies the size (or length) of record length 306b (e.g., in bytes).

As discussed above, in some embodiments, a size of the size value (e.g., size of the size 308b) is only added to the size metadata when the record length value is at least 128 bytes; representing the value therefore requires two or more bytes or octets of variable-length quantity encoding, which comprise record length 306b.

Figure 4:
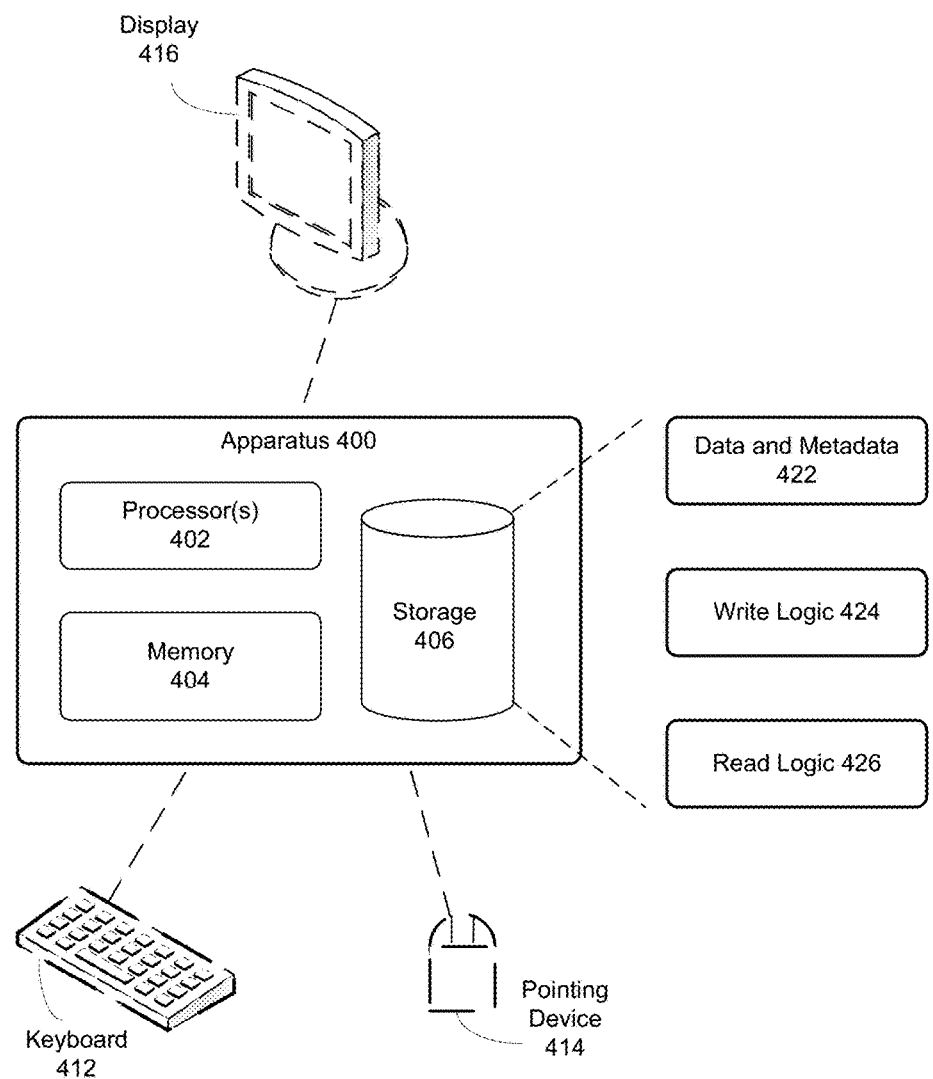
FIG. 4 depicts an apparatus for facilitating reverse reading of sequentially stored variable-length data, in accordance with some embodiments.

FIG. 4 depicts an apparatus for facilitating reverse reading of sequentially stored variable-length data, according to some embodiments.

Apparatus 400 of FIG. 4 includes processor(s) 402, memory 404, and storage 406, which may comprise any number of solid-state, magnetic, optical, and/or other types of storage components or devices. Storage 406 may be local to or remote from the apparatus. Apparatus 400 can be coupled (permanently or temporarily) to keyboard 412, pointing device 414, and display 416.

Storage 406 is (or includes) a data repository that stores data 422. Data 422 includes variable-length data records that are stored sequentially with corresponding size metadata. As described above, for example, the size metadata for a given record may include one or more bytes (or other storage units) that identify the length of the record (e.g., with variable-length quantity (VLQ) encoding). If more than one storage unit (or byte) is needed to store the record length, the record's size metadata includes an additional byte that identifies the size/length of the record length (e.g., the number of bytes used to store the record length). When the record length is stored with VLQ encoding, the most significant bit of the additional byte is set to one so that, during reverse reading, the reader can quickly determine that the byte does not store the record length, but rather the length (e.g., number of bytes) of the record length (or 'size of the size').

Storage 406 also stores logic and/or logic modules that may be loaded into memory 404 for execution by processor(s) 402, including write logic 424 and read logic 426. In other embodiments, these logic modules may be aggregated or divided to combine or separate functionality as desired or as appropriate. For example the write logic and read logic may be combined into a larger logic module that handles input/output for the data repository.

Write logic 424 comprises processor-executable instructions for writing to data 422 a new data record and accompanying/corresponding size metadata. Thus, for each new set of data to be stored, write logic 424 writes the data, determines the length of the new data record, writes the length after the data and, if more than one byte (or other threshold) is required to store the length, writes the additional size metadata byte (e.g., the 'size of the size' byte).

Read logic 426 comprises processor-executable instructions for reverse-reading data 422. Logic 426 may also be configured to read the data in the order it was stored. While reading the data in reverse order, for each record the reader logic first reads the last byte of the corresponding size metadata. If its most significant bit is zero, the byte stores the record's length and the reader can quickly calculate the offset to the start of the record and move there to read the record. If the most significant bit of the last byte is one, the rest of the last byte identifies the size of (e.g., number of bytes used to store) the record length. The reader logic can therefore quickly find the offset of the beginning of the length, read the length, and use it to calculate the start of the record.

Illustratively, in response to a read request or query specifying one or more attributes or characteristics of a desired data record (or set of records), and particularly when the most recent record(s) or most recent version of the desired record(s) are desired, read logic 426 traverses data 422 in reverse order from some starting point (e.g., the end of file, the starting offset of the last data record that was read). The read logic then navigates the data as described above. As the starting offset of each succeeding record is determined, some or all of the record may be read to determine whether it should be returned in response to the request or query.

Sequentially stored variable-length data records of data 422 may also (or instead) be read or traversed in reverse order (or, conversely, in the order they were stored) for some other purpose, such as to assemble an index or linked list of records, to purge and compress the data, etc.

An environment in which one or more embodiments described above are executed may incorporate a data center, a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of reverse-reading variable-length data records sequentially stored with corresponding size metadata in a data repository, the method comprising:
   subtracting one byte from a current read offset within the data repository, to yield a first read offset;
   reading one byte at the first read offset; and
   when a most significant bit of the one byte is 1:
      extracting a value from least significant bits of the one byte;
      subtracting the extracted value from the first read offset to yield a second read offset at which a length of a data record is stored;
      at the second read offset, reading a length of the data record; and
      subtracting the length of the data record from the second read offset to obtain an offset of the data record.

2. The method of claim 1, further comprising:
   receiving a set of data to be stored in the data repository;
   storing the set of data as a new data record following the size metadata of a previous data record;
   determining a length of the new data record; and
   storing the length of the new data record following the new data record.

3. The method of claim 2, further comprising:
   determining a size of the length of the new data record; and
   when the size of the length of the new data record is greater than a threshold, storing one additional byte following the length of the new data record, wherein:
      a most significant bit of the one additional byte is set to 1; and
      remaining bits of the one additional byte identify the size of the length of the new data record.

4. The method of claim 3, wherein:
   the length of the new data record is a first number of bytes used to store the new data record; and
   the size of the length of the new data record is a second number of bytes used to store the length of the new data record.

5. The method of claim 2, wherein:
   the length of the data record and the length of the new data record are stored with variable-length quantity encoding.

6. The method of claim 1, further comprising:
   prior to said subtracting the one byte, receiving a read request for data records matching one or more specified attributes; and
   after obtaining the offset of the data record, reading the data record to determine if the data record matches the one or more specified attributes.

7. The method of claim 1, further comprising, when the most significant bit of the one byte is 0:
   reading a value from the least significant bits of the one byte; and
   subtracting the read value from the first read offset to obtain an offset of a data record.

8. An apparatus for reverse-reading variable-length data records sequentially stored with corresponding size metadata in a data repository, the apparatus comprising:
   one or more processors; and
   memory storing instructions that, when executed by the one or more processors, cause the apparatus to:
      subtract one byte from a current read offset within the data repository, to yield a first read offset;
      read one byte at the first read offset; and
      when a most significant bit of the one byte is 1:
         extract a value from least significant bits of the one byte;
         subtract the extracted value from the first read offset to yield a second read offset at which a length of a data record is stored;
         at the second read offset, read a length of the data record; and
         subtract the length of the data record from the second read offset to obtain an offset of the data record.

9. The apparatus of claim 8, wherein the memory further stores instructions that, when executed by the one or more processors, cause the apparatus to:
   receive a set of data to be stored in the data repository;
   store the set of data as a new data record following the size metadata of a previous data record;
   determine a length of the new data record; and
   store the length of the new data record following the new data record.

10. The apparatus of claim 9, wherein the memory further stores instructions that, when executed by the one or more processors, cause the apparatus to:
determine a size of the length of the new data record; and
when the size of the length of the new data record is greater than a threshold, store one additional byte following the length of the new data record, wherein:
a most significant bit of the one additional byte is set to 1; and
remaining bits of the one additional byte identify the size of the length of the new data record.

11. The apparatus of claim 10, wherein:
the length of the new data record is a first number of bytes used to store the new data record; and
the size of the length of the new data record is a second number of bytes used to store the length of the new data record.

12. The apparatus of claim 9, wherein:
the length of the data record and the length of the new data record are stored with variable-length quantity encoding.

13. The apparatus of claim 8, wherein the memory further stores instructions that, when executed by the one or more processors, cause the apparatus to:
prior to said subtracting the one byte, receive a read request for data records matching one or more specified attributes; and
after obtaining the offset of the data record, read the data record to determine if the data record matches the one or more specified attributes.

14. The apparatus of claim 8, wherein the memory further stores instructions that, when executed by the one or more processors, cause the apparatus to, when the most significant bit of the one byte is 0:
read a value from the least significant bits of the one byte; and
subtract the read value from the first read offset to obtain an offset of a data record.

15. A system for reverse-reading variable-length data records sequentially stored with corresponding size metadata in a data repository, comprising:
at least one processor; and
a reader module comprising a non-transitory computer-readable medium storing instructions that, when executed, cause the system to:
subtract one byte from a current read offset within the data repository, to yield a first read offset;
read one byte at the first read offset; and
when a most significant bit of the one byte is 1:
extract a value from least significant bits of the one byte;
subtract the extracted value from the first read offset to yield a second read offset at which a length of a data record is stored;
at the second read offset, read a length of the data record; and
subtract the length of the data record from the second read offset to obtain an offset of the data record.

16. The system of claim 15, further comprising:
a writer module comprising a non-transitory computer-readable medium storing instructions that, when executed, cause the system to:
receive a set of data to be stored in the data repository;
store the set of data as a new data record following the size metadata of a previous data record;
determine a length of the new data record; and
store the length of the new data record following the new data record.

17. The system of claim 16, wherein the non-transitory computer-readable medium of the writer module further stores instructions that, when executed, cause the system to:
determine a size of the length of the new data record; and
when the size of the length of the new data record is greater than a threshold, store one additional byte following the length of the new data record, wherein:
a most significant bit of the one additional byte is set to 1; and
remaining bits of the one additional byte identify the size of the length of the new data record.

18. The system of claim 17, wherein:
the length of the new data record is a first number of bytes used to store the new data record; and
the size of the length of the new data record is a second number of bytes used to store the length of the new data record.

19. The system of claim 16, wherein:
the length of the data record and the length of the new data record are stored with variable-length quantity encoding; and
the system further comprises the data repository.

20. The system of claim 15, wherein the non-transitory computer-readable medium of the reader module further stores instructions that, when executed, cause the system to:
prior to said subtracting the one byte, receive a read request for data records matching one or more specified attributes; and
after obtaining the offset of the data record, read the data record to determine if the data record matches the one or more specified attributes.

* * * * *